March 9, 1943.  V. C. HALL  2,313,543
ELECTRO-OPTICAL SYSTEM
Filed Nov. 1, 1941
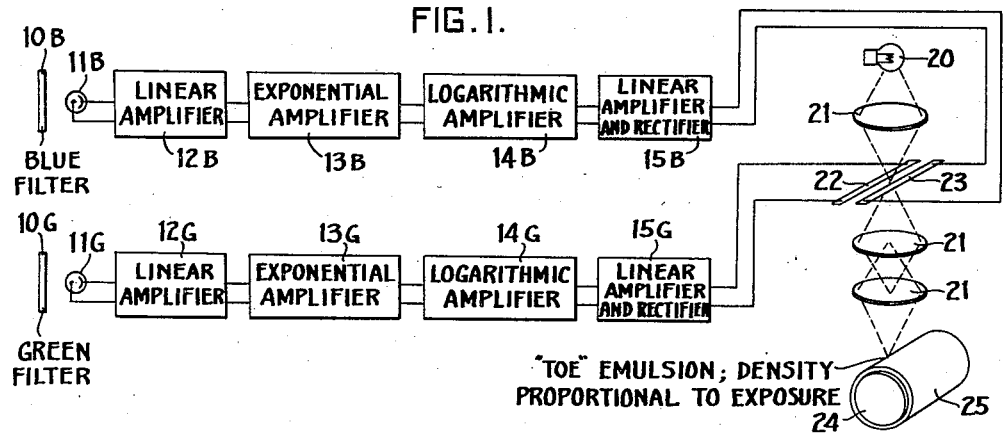
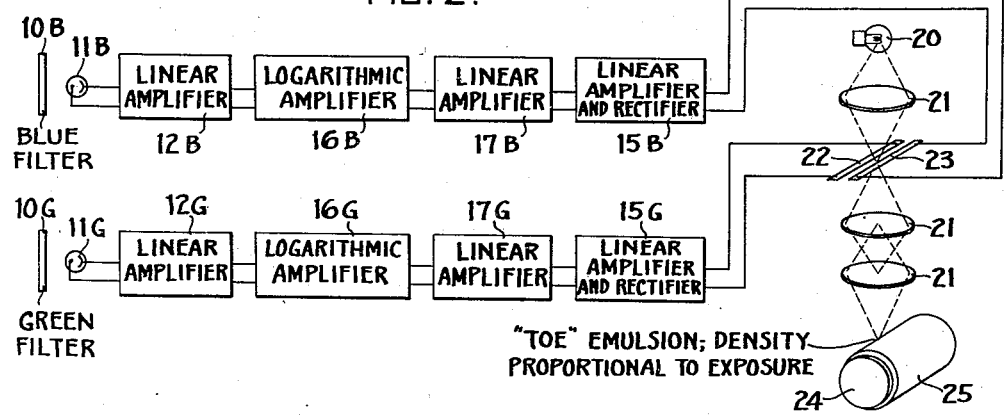
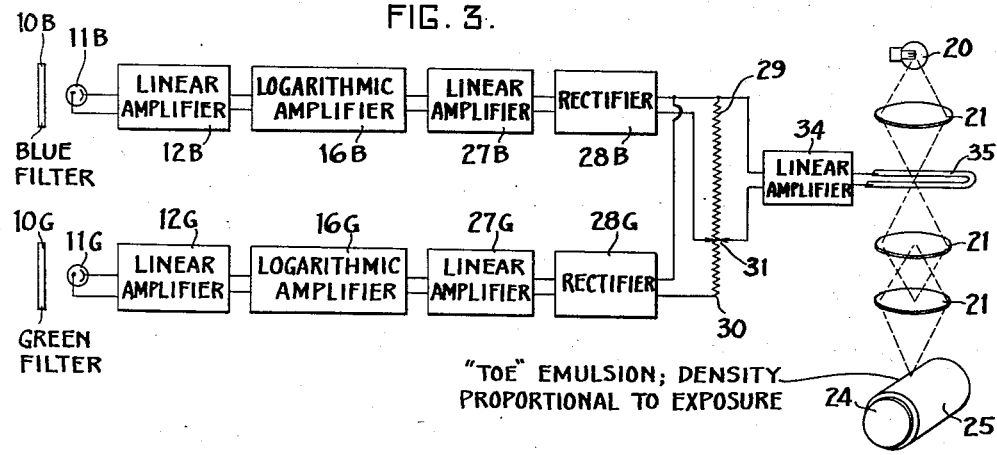
VINCENT C. HALL
*INVENTOR*
BY Newton M. Perrins
*ATTORNEY*

Patented Mar. 9, 1943

2,313,543

UNITED STATES PATENT OFFICE 2,313,543

ELECTRO-OPTICAL SYSTEM

Vincent C. Hall, Rochester, N. Y., assignor to Eastman Kodak Company, Rochester, N. Y., a corporation of New Jersey Application November 1, 1941, Serial No. 417,541

15 Claims. (Cl. 178—5.2)

This invention relates to electro-optical systems, and particularly to those used in the reproduction of multi-colored originals.

In color reproduction, various types of color correction are possible. For example, the correction of those relatively minor errors existing in additive processes of color reproduction require, according to theory, the linear subtraction of quantities linearly proportional to the transmission or reflectivity of the original subject to the different colors. In subtractive processes the most important errors are those due to the unwanted absorptions by the dyes or pigments used in the reproduction itself. Both practice and theory has proven that this type of correction requires the division of reflectivities or the equivalent, which is the subtraction of quantities logarithmically proportional to the reflectivities or transmissions. Photographic masking, in which a color separation negative is masked by a thin positive involves the addition of densities one of which is negative with respect to the other, and since densities of ordinary photosensitive layers are logarithmically proportional to exposures which in turn are linearly proportional to transmissions or reflectivities, the theoretical requirement that logarithmic quantities be subtracted is met.

Combinations of these types of correction are possible and one modification involving the addition of "linear" quantities followed by the subtraction of "logarithmic" quantities has been proposed by J. A. C. Yule, in U. S. Patents 2,176,518 and 2,221,037. Also, in my U. S. Patent 2,249,522 and my copending application, Serial No. 393,418, filed May 14, 1941, I have described electro-optical circuits employing exponential amplifiers and producing the multiplication of one "linear" quantity by a constant minus another "linear" quantity in a manner which is equivalent to the division of linear quantities or the subtraction of logarithmic quantities.

It is an object of the present invention to provide a method and means for producing masking type correction of one color signal by another in the form of division of color transmissions or reflectivities raised to exponents whose ratio is the masking factor. The term "masking factor" is borrowed from the photographic methods of color correction in which a color separation negative having for example a contrast or gamma of 1.2 is masked by a thin positive of a correcting color, which positive has a gamma of .6 say, the masking factor being .6/1.2 which equals .5.

According to the present invention, the method of producing such correction consists in setting up in two electric channels each of which has a logarithmic amplifier, currents logarithmically proportional respectively to the color transmissions (in the case of a transparency) or reflectivities (in the case of a print or painting) which transmissions or reflectivities are raised to exponents which eventually correspond to the gammas of the photographic process. That is, the exponents must be such that their ratio is the required masking factor. The two currents are then used in linear opposition, i. e. so that their intensities are subtracted, to modulate a light beam which scans a photosensitive surface such as a film whose response is such that density is predominantly linearly proportional to exposure. Such photographic emulsions are available and are even more easy to obtain than those in which transmission is inversely proportional to exposure. Both of these forms of photosensitive layers are referred to as "toe" emulsions.

There are two methods of obtaining the linear subtraction of the logarithmic currents. One of these is the preferable one and employs a ribbon type light valve having parallel ribbons independently operated in accordance with each color and in the same direction so that the light transmitted between them is proportional to the difference of the operating currents. The use of such a light valve for color correction is broadly disclosed in a copending application filed concurrently herewith by Streiffert and myself.

The other method of obtaining linear subtraction employs a linear modifying circuit connected between the two channels for producing a current proportional to the difference of the two channel currents and then operating at least one light valve in accordance with the output of this modifying circuit. Such a circuit may involve simply the superposition in opposition of the two currents across a single resistor. Of course, the output of this linear modifying circuit may operate more than one valve such as described in my copending application 393,418 mentioned above where two or more valves are used in electrical series and optical tandem to get a squaring effect. In this embodiment, the light valve may be either a ribbon type light valve of the ordinary type or may be a glow lamp or any of the other known types of light valves such as used in sound recording.

There are also two methods of setting up in each channel a current logarithmically proportional to the transmission or reflectivity raised to a given exponent which, as pointed out above, corresponds to the gamma of photographic processes. In one method, the output of the photoelectric cell receiving the color from the original is linearly amplified, then logarithmically amplified and then linearly amplified again, the latter linear amplification factor being equal to the required exponent.

Logarithmic amplifiers and circuits are known and are described in the following publications:

"A vacuum-tube voltmeter with logarithmic response," F. V. Hant, Rev. Sci. Instru. vol. 4 p. 672, Dec. 1933.

"Linear decibel meter using cuprous oxide," K. Akazawa & H. Uno, Electro Technical Journal, p. 119, May 1939.

"A device for direct reproduction from variable density sound negatives," W. J. Albersheim, Jour. Soc. Mot. Pict. Eng., p. 274, Sept. 1937.

Alternatively, the required currents may be established by including an exponential amplifier ahead of the logarithmic amplifier so that the output is the logarithm of the reflectivity or transmission raised to the required exponent. Exponential amplifiers are discussed in detail in my patent and copending application mentioned above.

Or again, the required currents may be set up by a combination of these two systems; that is, an exponential amplifier may be followed by a logarithmic amplifier which in turn is followed by a linear amplifier to give the required current.

The invention will be fully understood from the following description when read in connection with the accompanying drawing in which the figures are simplified to show clearly the gist of the invention and:

Fig. 1 shows a circuit according to one embodiment of the invention,

Fig. 2 shows a slightly different circuit for producing the same results and,

Fig. 3 shows still a different embodiment of the invention.

In Fig. 1 the correction of blue by green is illustrated, but the invention is equally applicable to the other types of masking correction which have been proposed. Light from the original, not shown, passes through a suitable beam-splitter and, if A. C. amplification is to be used in the channels, a light chopper may also be included in the optical path. The light then passes through filters 10B and 10G to impinge on photoelectric cells 11B and 11G respectively setting up in the corresponding channels currents proportional to these colors from the original. The output of the photoelectric cells 11B and 11G is amplified respectively by the linear amplifiers 12B and 12G, the exponential amplifiers 13B and 13G, the logarithmic amplifiers 14B and 14G and finally the linear amplifiers and rectifiers 15B and 15G so that in the output of the latter amplifiers the current is logarithmically proportional to the output of the photoelectric cells raised to predetermined exponents. If a .5 masking factor is required (the masking factor is determined by the absorption of blue by the magneta dye or pigment used in the final reproduction) the exponent of the output of amplifier 15G should be .5 of the exponent of the output of the amplifier 15B. If the linear amplifiers and rectifiers 15B and 15G have amplification factors of unity, the exponential amplifiers 13B and 13G must be such that the exponent in the case of 13G is just one-half of the exponent in the case of 13G. Exponential amplifiers with fractional exponents are well known and are described in my patent and copending application mentioned above. Of course in all of these circuits the rectification is really demodulation.

These logarithmic currents are used to operate ribbons 22 and 23 in a single light valve, the ribbons being parallel to one another and moving in the same direction for increasing current. The valve is shown in the conventional manner, the magnets for reproducing the magnetic field being omitted for the sake of clarity. Light from a light source 20 through a suitable optical system consisting of lenses 21 is modulated by passing between the ribbons 22 and 23 and scans a photosensitive layer 25 mouned on a rotating drum 24. An increase in the output of the amplifier 15B causes the ribbon 23 to move so that more light is transmitted, whereas an increase in the output of the amplifier 15G causes the ribbon 22 to move toward the ribbon 23 causing less light to be transmitted by the valve; it is to be noted that the movement of the two ribbons is in the same direction giving opposite effects.

The photosensitive layer 25 is a "toe" emulsion in which density is proportional to exposure. Since the exposure may be considered equal to $$C_1(\log R_B^M - \log R_G^N)$$

the density of the record 25 after development is equivalent to $$C_2 \log \frac{R_B^M}{R_G^N}$$

where $C_1$ and $C_2$ are constants, $R_B$ and $R_G$ are the blue and green reflectivities of the original and M and N are the exponents whose ratio N/M equals the masking factor, which expression means that the density is proportional to the division of quantities exponentially proportional to the reflectivities or transmissions of the original as required by the masking type of color correction.

Fig. 2 is similar to Fig. 1, but the exponential amplifiers have been omitted and logarithmic amplifiers 16B and 16G followed respectively by linear amplifiers 17B and 17G have been substituted. Linear amplification of the output of a logarithmic amplifier multiplies that output by the amplification factor which is equivalent to raising to an exponent all those signals falling in the range over which the output of the logarithmic amplifier is logarithmic with respect to the input. This is clear from a mathematical consideration of the operation of logarithms.

Thus Figs. 1 and 2 show alternative methods both employing logarithmic amplifiers for obtaining currents which are logarithmically proportional to reflectivities or transmissions raised to exponents whose ratio is the required masking factor. Both figures employ a ribbon type valve with parallel ribbons independently operated to obtain the subtraction of these currents.

In Fig. 3 an alternative method for obtaining this linear subtraction of logarithmic quantities is illustrated, and in this case the currents finally set up by linear amplifiers 27B and 27G are fed into rectifiers 28B and 28G respectively and superimposed in opposition across a resistor 29. The portions of the resistor 29 need not be identical for the two channels, nor need the whole of the resistor be across the output thereof. This is indicated by the adjustability of the point or points 31 relative to the point 30. This output is fed through a linear (D. C.) amplifier 34 to operate an ordinary ribbon type valve 35 in the scanning beam. Similarly it may be used to operate a glow lamp in place of the light source 20.

Having thus described in simplest terms, several variations of my invention, I wish to point out that it is not limited to the structures but is of the scope of the appended claims.

What I claim and desire to secure by Letters Patent of the United States is:

1. In electro-optical systems for the reproduction of a multicolored original, the method of producing masking type correction of one-color signal by another in the form of division of color transmissions or reflectivities raised to exponents whose ratio is the masking factor, which method comprises setting up in two electric channels with logarithmic amplifiers, currents logarithmically proportional respectively to said transmissions or reflectivities raised to said exponents, scanning by light, a photosensitive surface whose response has density predominantly linearly proportional to exposure and modulating said light in accordance with the intensities of the two currents linearly subtracted from one another.

2. The method according to claim 1 including the step of operating parallel ribbons in a ribbon type valve independently, respectively, linearly and in the same direction in accordance with the two currents, said modulating being by said valve positioned in the path of the light.

3. The method according to claim 1 including the step of subtracting the currents electrically to give a single current equal to the difference of the two, said modulating being by light modulating means which are part of the means for providing the scanning and which are operated by said single current.

4. The method according to claim 1 in which the current setting up includes the steps of establishing by photoelectric cells currents linearly proportional to said transmissions or reflectivities, logarithmically amplifying said linearly proportional currents and then linearly amplifying the resulting logarithmically proportional currents with amplification factors corresponding to said exponents.

5. The method according to claim 1 in which the current setting up includes the steps of establishing by photoelectric cells currents linearly proportional to said transmissions or reflectivities, exponentially amplifying said linearly proportional currents and then logarithmically amplifying the resulting exponentially proportional currents.

6. A device for producing from a multicolored original a color separation record color corrected by a masking factor by a correcting color, comprising a photosensitive layer whose response is density linearly proportional to exposure, two photoelectric channels with logarithmic amplifiers for receiving the two colors from the original and setting up currents logarithmically proportional to the intensities of said colors raised to exponents whose ratio is said masking factor and means for scanning the layer with light modulated in accordance with the difference between the intensities of the two currents.

7. A device according to claim 6 in which the scanning means comprises a light source and between the source and the layer a ribbon type light valve having two parallel independently operated ribbons connected respectively to the two channels for linear operation in the same direction in accordance with the two currents.

8. A device according to claim 6 including a linear modifying circuit connected between the two channels for producing a current proportional to the difference of the two channel currents and in which the scanning means includes a light valve connected to the output of the modifying circuit for operation in accordance with said difference current.

9. A device according to claim 6 in which each channel includes only linear and logarithmic amplifiers, the linear amplifiers after the logarithmic amplifiers having amplication factors equal to the corresponding exponents.

10. A device according to claim 6 in which each channel includes an exponential amplifier ahead of the logarithmic amplifier and amplifying in accordance with the corresponding exponent.

11. Apparatus for scanning a photosensitive layer whose response is density linearly proportional to exposure to give from a multicolored original a color separation record color corrected by a masking factor by a correcting color comprising photoelectric channels with logarithmic amplifiers for receiving the two colors from the original and for setting up currents logarithmically proportional to the intensities of said colors raised to exponents whose ratio is said masking factor and means for scanning the layer with light modulated in accordance with the difference between the intensities of the two currents.

12. Apparatus according to claim 11 in which the scanning means comprises a light source and in front of the source a ribbon type light valve having two parallel independently operated ribbons connected respectively to the two channels for linear operation in the same direction in accordance with the two currents.

13. Apparatus according to claim 11 including a linear modifying circuit connected between the two channels for producing a current proportional to the difference of the two channels currents and in which the scanning means includes a light valve connected to the output of the modifying circuit for operation in accordance with said difference current.

14. Apparatus according to claim 11 in which each channel includes only linear and logarithmic amplifiers, the linear amplifiers after the logarithmic amplifiers having amplification factors equal to the corresponding exponents.

15. Apparatus according to claim 11 in which each channel includes an exponential amplifier ahead of the logarithmic amplifier and amplifying in accordance with the corresponding exponent.

VINCENT C. HALL.